L. B. SKINNER.
FRUIT DRIER.
APPLICATION FILED APR. 12, 1916.

1,214,234.

Patented Jan. 30, 1917.
2 SHEETS—SHEET 1.

WITNESSES

INVENTOR
Lee B. Skinner
BY
ATTORNEYS

L. B. SKINNER.
FRUIT DRIER.
APPLICATION FILED APR. 12, 1916.

1,214,234.

Patented Jan. 30, 1917
2 SHEETS—SHEET 2.

WITNESSES

INVENTOR
Lee B. Skinner
BY
Munn & Co
ATTORNEYS

UNITED STATES PATENT OFFICE.

LEE BRONSON SKINNER, OF DUNEDIN, FLORIDA, ASSIGNOR TO L. B. SKINNER MANU-FACTURING CO., OF DUNEDIN, FLORIDA.

FRUIT-DRIER.

1,214,234. Specification of Letters Patent. Patented Jan. 30, 1917.

Application filed April 12, 1916. Serial No. 90,616.

*To all whom it may concern:*

Be it known that I, LEE B. SKINNER, a citizen of the United States, and a resident of Dunedin, in the county of Pinellas and State of Florida, have invented a new and Improved Fruit-Drier, of which the following is a full, clear, and exact description.

My invention relates to means for handling citrus fruits in packing houses, and more particularly to a machine for drying citrus fruits after they have passed through the washing machine.

It is essential that citrus fruits, after they have been washed and before they are wrapped and packed, shall be thoroughly freed of all moisture, and in consequence it is usual to pass such fruits from the washer to a drier through which the fruits are conveyed and in which they are subjected to a blast of warm air which dries the moisture on the surface of the fruits.

The object of the present invention is to provide a drier in which in addition to subjecting the fruit to the action of air they shall also be subjected to a wiping action of a yielding absorbent diaphragm, which in addition to removing the moisture from the fruit controls the delivery of the air to the surface of the fruit.

A further object of the invention is to provide a fruit drying machine with means whereby as the fruit is carried through the same, the fruit will have imparted thereto rolling movements alternately in opposite directions, so as to insure that the entire surface of the fruit shall be subjected to the action of the air and to the wiping action of the absorbent diaphragm.

With the foregoing objects in view, my invention consists of a fruit drying machine having means for conveying the fruit through the same, means for delivering air under pressure to the fruit, and a flexible and absorbent diaphragm interposed between the air inlet and the fruit, and arranged to contact with the fruit as it passes through the machine.

My invention further consists of a fruit drying machine having in combination with fruit drying and conveying mechanism, means whereby a rolling action is imparted to the fruit alternately in opposite directions transversely to the path of movement of the fruit through the machine.

My invention further consists of the devices and combinations of devices which will be hereinafter specifically described and claimed.

My invention is illustrated in the accompanying drawings, in which—

Figure 1:
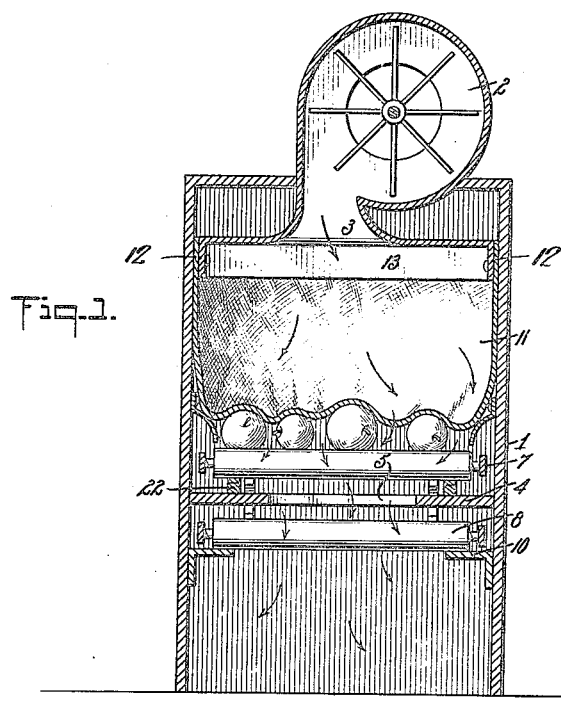
Figure 2:
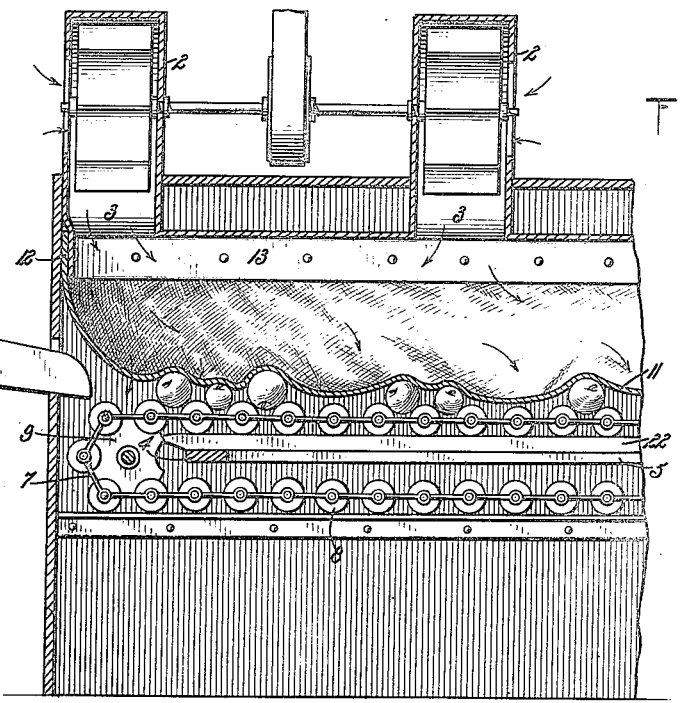
Figure 3:
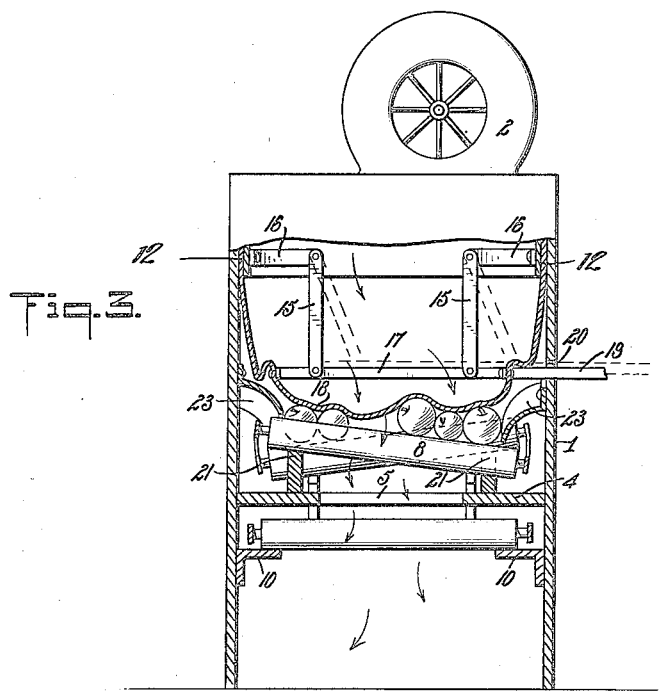

Figure 1 shows a vertical transverse section through a well known type of fruit drying machine in which my invention has been embodied; Fig. 2 shows a vertical longitudinal section of one end of the machine; Fig. 3 shows a vertical transverse section through the preferred form of the machine, and Fig. 4 shows a vertical longitudinal section through one end of the machine shown in Fig. 3.

Similar reference characters will be employed to designate corresponding parts.

Figure 4:
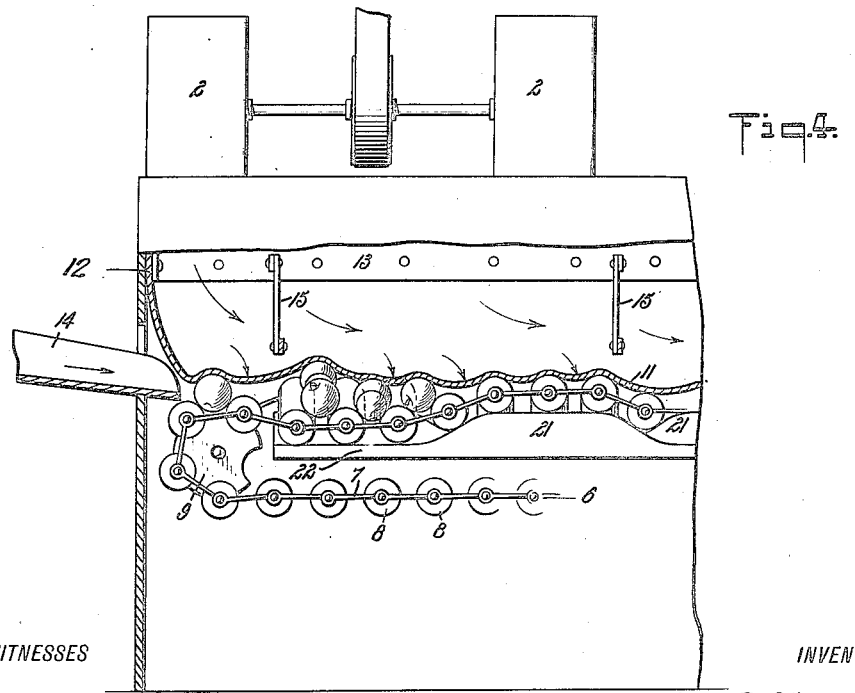

In the preferred form of my invention as shown in Figs. 3 and 4, the machine is shown as comprising a suitable frame or casing 1 provided with blowers or other means of producing air pressure, which lead into the upper part of the machine through the top thereof by the air inlets 3.

Extending longitudinally through the machine and at a suitable height, there is arranged a table 4 which at suitable points is provided with air outlets 5. This table 4 supports the upper run of an endless conveyer 6, which in the machine of the drawing is shown as composed of the chains 7 supporting and carrying the transversely extending parallel rollers 8. This conveyer is driven by suitable sprocket wheels 9, one only being shown in the drawings, it being clear however to those familiar with such machines that there is another set of sprocket wheels at the opposite end but which are not shown. The lower run of the conveyer 6 is supported upon brackets 10 mounted upon the inner surface of the vertical walls of the frame 1.

Between the air inlets 3 and the upper run of the conveyer, I provide a porous diaphragm 11 which is made of any suitable porous textile fabric and which has its edge 12 turned upward and tightly clamped between the flange 13 and the outer wall or casing of the frame 1. By this means a bag-like depending diaphragm is formed extending through the machine above the conveyer so that it will contact with the fruit resting on the conveyer, as shown clearly in the drawings, and it performs the double function of wiping and absorbing the moisture from the surface of the fruit, and controlling the delivery of the air under pressure to the surface of the fruit, the air being forced through the interstices of the porous diaphragm 11.

In the machine thus constructed, as the conveyer 6 carries the fruit through the machine which is delivered thereto at one end from a trough 14, the diaphragm will effectually remove the moisture from the surface of the fruit and will be assisted in this work by the blasts of warm air which pass through the diaphragm, the air acting also to dispel to some extent the moisture absorbed by the porous diaphragm. If a conveyer such as is shown is utilized, the fruit will be rotated by the rotary motion of the rollers 8, and thus there will be a tendency to bring all the outer surface of the fruit under the action of the porous diaphragm 11.

In order that the diaphragm 11 may more effectually operate on the surface of the fruit, it may have imparted thereto, or to the lower portion thereof, a lateral reciprocating movement, and to this end the machine is provided with depending links 15 which are pivotally mounted at their upper ends to brackets 16, and at their lower ends pivotally connected to cross bars 17 which are fastened within and to the porous diaphragm 11, in such a manner as to leave a slack portion 18, as shown in Fig. 3.

By means of a link or rod 19 projecting through an opening 20 in one side of the frame 1, suitable lateral reciprocations may be imparted to the cross bars 17 and thus to the slack portion 18 of the porous diaphragm. Any suitable means may be employed to provide the lateral reciprocations to the link or rod 19.

It is further desired to insure the complete contact of the surface of the fruit with the porous diaphragm, and for this purpose I have provided means whereby a lateral rolling action crosswise of the machine is imparted to the fruit as the fruit is carried through the machine, and to this end I have shown the machine as being provided with elevations 21 of the track 22 which supports the rollers in the upper run of the conveyer and over which the rollers pass, these elevations 21 being located at intervals throughout the length of the machine and alternately disposed so that as the rollers of the conveyer in the upper run pass along the track 22, their opposite ends will be alternately elevated, thus causing the fruit to roll from side to side as clearly indicated in Figs. 3 and 4 of the drawings. In order to insure that the fruit shall not roll off the rollers of the conveyer, suitable guards 23 are provided as shown in Fig. 3.

In the operation of the machine, the fruit as it comes from the washer is delivered to the trough 14, and from the trough to the upper surface of the conveyer 6. The conveyer carries the fruit through the machine and it is subjected to the action of the porous diaphragm 11, and the air being forced through the diaphragm by the blowers 2. The diaphragm is moved from side to side in contact with the fruit, and the fruit is caused to roll from side to side by the alternate elevation and depression of the opposite sides of the conveyer. This rolling motion of the fruit may, however, be obtained by either the motion of the diaphragm or the alternate elevation and depression of the opposite sides of the conveyer alone.

Having described my invention, I claim as new and desire to protect by Letters Patent of the United States:

1. In a fruit drying machine, in combination, a conveyer for the fruit, means for subjecting the fruit to the drying action of air, and a porous diaphragm interposed between the air inlet and the fruit.

2. In a fruit drying machine, in combination, a conveyer for the fruit, means for subjecting the fruit to the drying action of air, a porous diaphragm interposed between the air inlet and the fruit, the said diaphragm kept in contact with the fruit by the pressure of the air above the diaphragm, and means for imparting a lateral movement to the diaphragm.

3. In a fruit drying machine, in combination, a conveyer for the fruit, means for subjecting the fruit to the drying action of air, a porous diaphragm interposed between the air inlet and the fruit, the said diaphragm kept in contact with the fruit by the pressure of air above the diaphragm, and means for imparting to the fruit a lateral rolling action alternately in opposite directions.

4. In a fruit drying machine, in combination, a conveyer for the fruit, means for subjecting the fruit to the drying action of air, and means acting on the upper run of the conveyer to alternately raise and lower the opposite sides of the conveyer.

5. In a fruit drying machine, in combination, a conveyer for the fruit, means for subjecting the fruit to the drying action of air, and means for imparting to the fruit lateral rolling movements alternately in opposite directions.

6. In a fruit drying machine, in combination, means for subjecting the fruit to drying action of air, a conveyer for the fruit comprising endless carriers and transversely arranged parallel rollers supported by said carriers, and means acting on the upper run of the conveyer to alternately raise and lower the ends of the rollers.

7. In a fruit drying machine, in combination, means for subjecting the fruit to the drying action of air, a conveyer for the fruit, means acting on the upper run of the conveyer to alternately raise and lower the opposite sides of the conveyer, and a diaphragm interposed between the air inlet and the fruit and kept in contact with the fruit by the action of the air.

8. In a fruit drying machine, in combination, means for subjecting the fruit to the drying action of air, a porous diaphragm interposed between the air inlet and the fruit, a conveyer comprising endless carriers, transversely arranged parallel rollers supported by said carriers, and means acting on the upper run of the conveyer to alternately raise and lower opposite ends of the rollers.

9. In a fruit drying machine, in combination, means for subjecting the fruit to the drying action of air, a porous diaphragm interposed between the air inlet and the fruit, means for imparting a lateral motion to the diaphragm, a conveyer comprising endless carriers and transversely arranged parallel rollers supported by said carriers, and means acting on the upper run of the conveyer to alternately raise and lower opposite ends of the rollers.

10. In a fruit drying machine, in combination, means for subjecting the fruit to the drying action of air, a conveyer for the fruit, means acting on the upper run of the conveyer to alternately raise and lower the opposite sides of the conveyer, a diaphragm interposed between the air inlet and the fruit and kept in contact with the fruit by the action of the air, and means for imparting lateral motion to the diaphragm.

11. In a fruit drying machine, in combination, means for subjecting the fruit to drying action of air, means for conveying the fruit through the machine, means for imparting thereto lateral rolling motions alternately in opposite directions, and a porous diaphragm interposed between the air inlet and the fruit and kept in contact with the fruit by the pressure of the air.

12. In a fruit drying machine, in combination, means for subjecting the fruit to the drying action of air, means for conveying the fruit through the machine, means for imparting thereto lateral rolling motions alternately in opposite directions, a porous diaphragm interposed between the air inlet and the fruit and kept in contact with the fruit by the pressure of air, and means for imparting lateral motion to the diaphragm.

In testimony whereof I have signed my name to the specification in the presence of two subscribing witnesses.

LEE BRONSON SKINNER.

Witnesses:
D. B. COLLIER,
B. C. SKINNER.